United States Patent [19]

Lermann et al.

[11] 4,176,934
[45] Dec. 4, 1979

[54] ARRANGEMENT OF A PHOTOGRAPHIC CAMERA

[75] Inventors: Peter Lermann, Narring; Günter Fauth, Unterhaching, both of Fed. Rep. of Germany

[73] Assignee: AGFA-Gevaert, A.G., Leverkusen, Fed. Rep. of Germany

[21] Appl. No.: 885,074

[22] Filed: Mar. 9, 1978

[30] Foreign Application Priority Data

Mar. 10, 1977 [DE] Fed. Rep. of Germany ....... 2710414

[51] Int. Cl.² ..................... G03B 15/00; G03B 17/50; G03B 17/04; G03B 13/02
[52] U.S. Cl. ..................................... 354/150; 354/86; 354/187; 354/219
[58] Field of Search ................... 354/83, 86, 187, 219, 354/150, 152, 155, 224, 225, 192-194

[56] References Cited

U.S. PATENT DOCUMENTS

| | | | |
|---|---|---|---|
| 3,240,107 | 3/1966 | Prister | 354/219 |
| 3,791,274 | 2/1974 | Hansen | 354/150 |
| 3,836,933 | 9/1974 | Hochreiter | 354/187 |
| 3,941,464 | 3/1976 | Waaske | 354/219 X |

FOREIGN PATENT DOCUMENTS 1123543  6/1956  France ..................... 354/224

*Primary Examiner*—Donald A. Griffin
*Attorney, Agent, or Firm*—Michael J. Striker

[57] ABSTRACT

A photographic camera comprises two deviating mirrors arranged within the camera housing between the objective and the film strip in such a manner that the optical axis of the light rays between the objective and the assigned first mirror lies on a different plane than the optical axis of the rays between the second mirror and the film strip.

8 Claims, 24 Drawing Figures

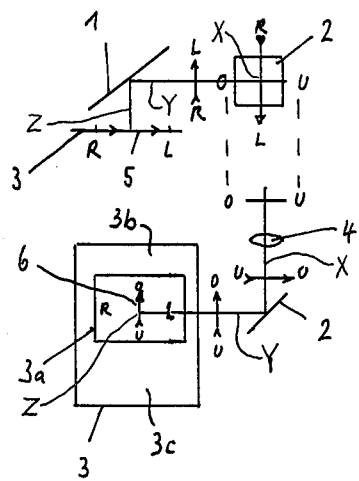
Fig.1
Fig.1'
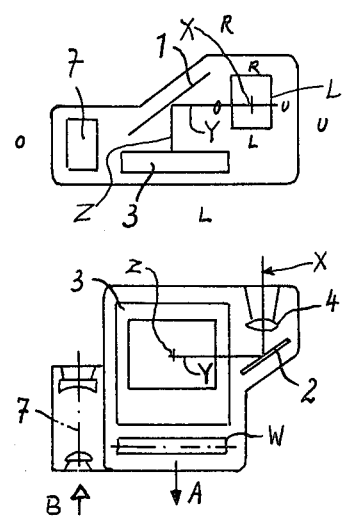
Fig.1a
Fig.1'a
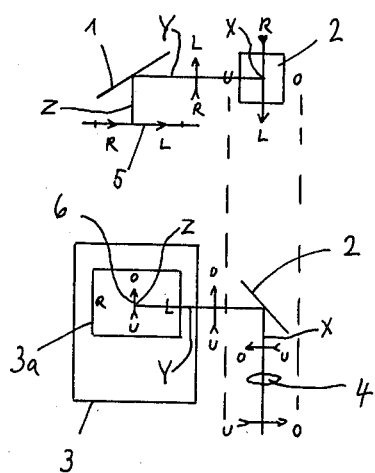
Fig.2
Fig.2'
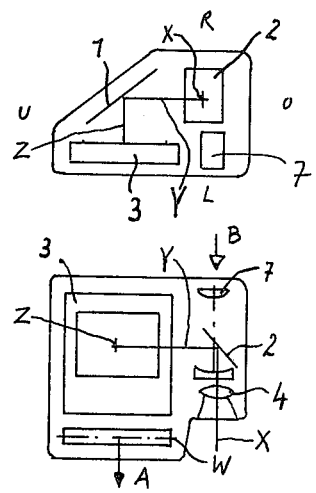
Fig.2a
Fig.2'a

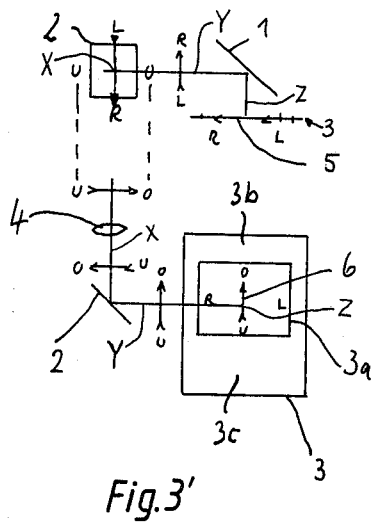
Fig. 3
Fig. 3'
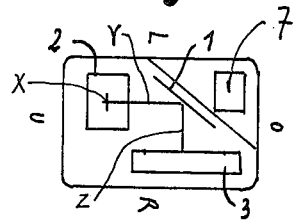
Fig. 3a
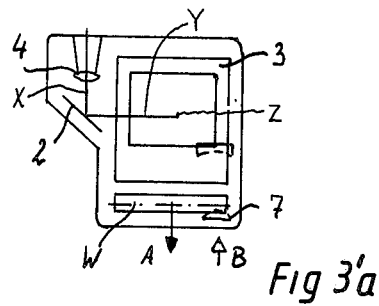
Fig 3'a
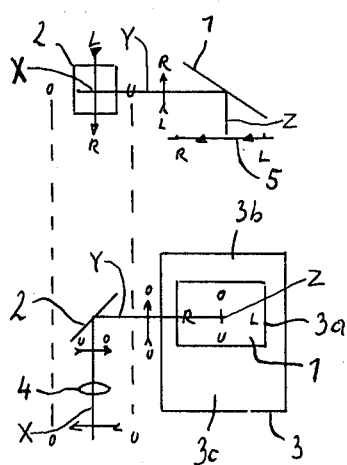
Fig. 4
Fig. 4'
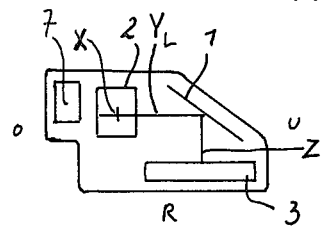
Fig. 4a
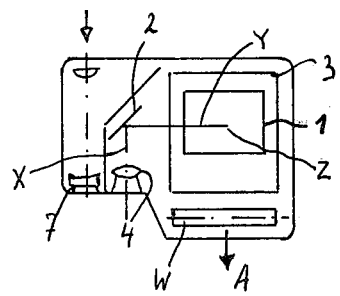
Fig. 4'a

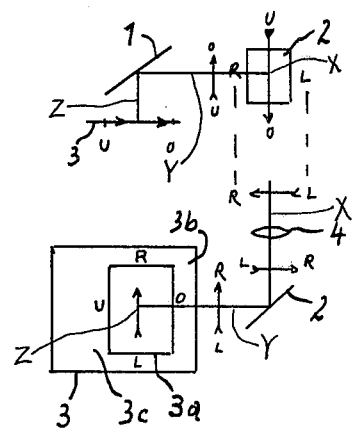
Fig. 5
Fig. 5'
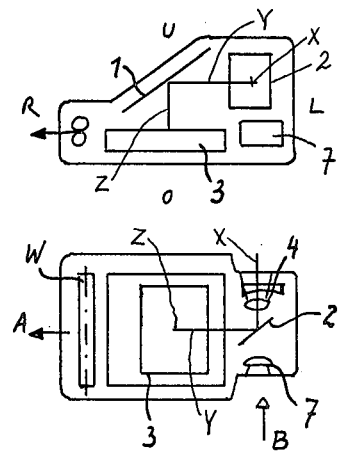
Fig. 5a
Fig. 5'a
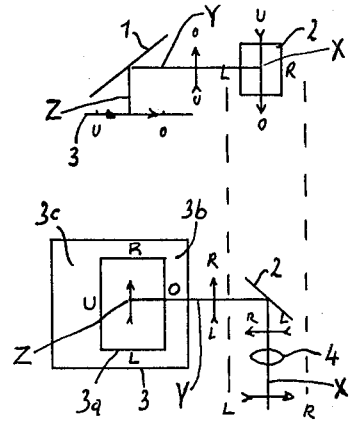
Fig. 6
Fig. 6'
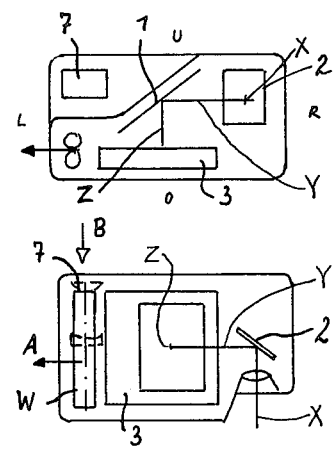
Fig. 6a
Fig. 6'a

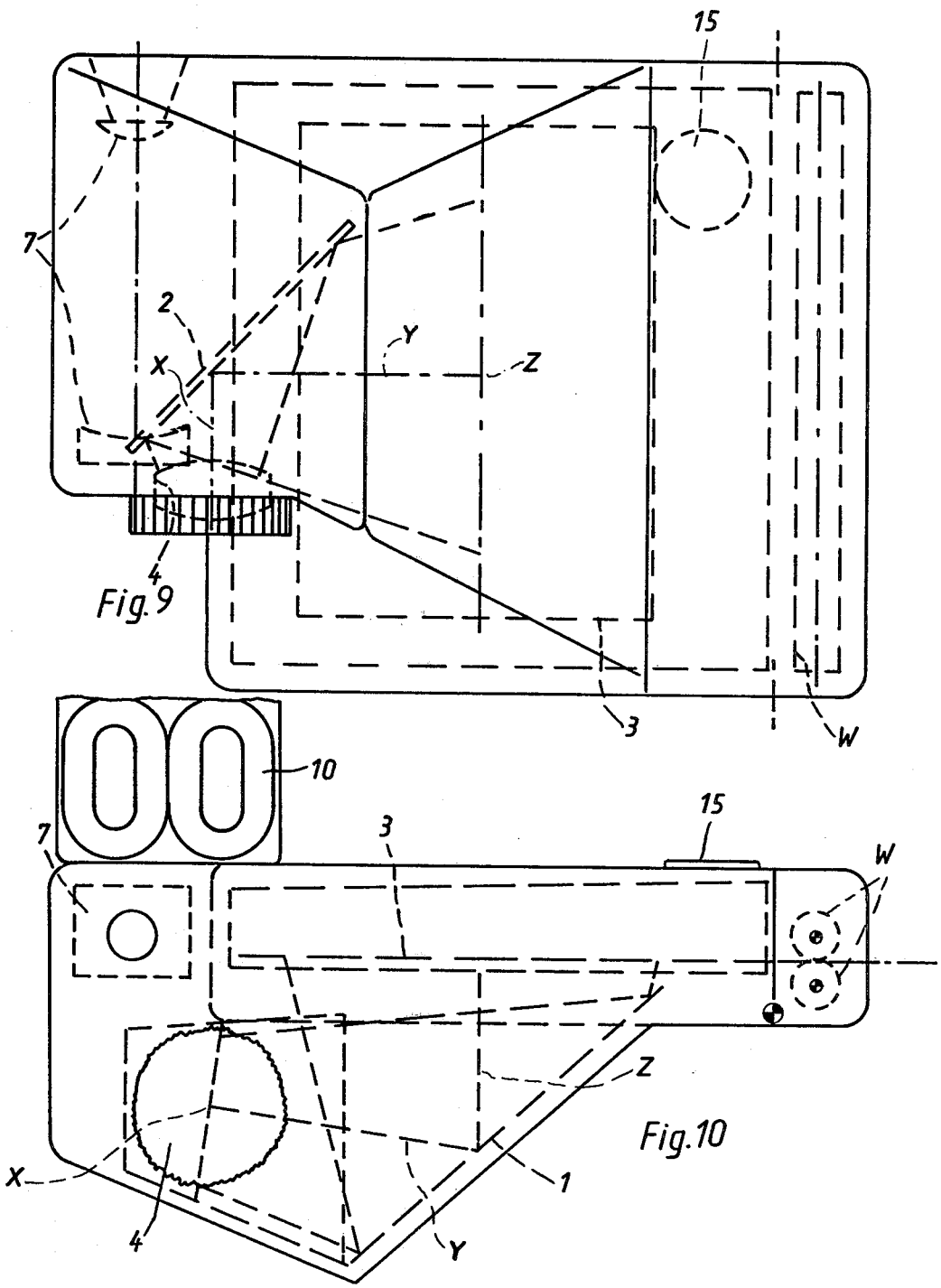

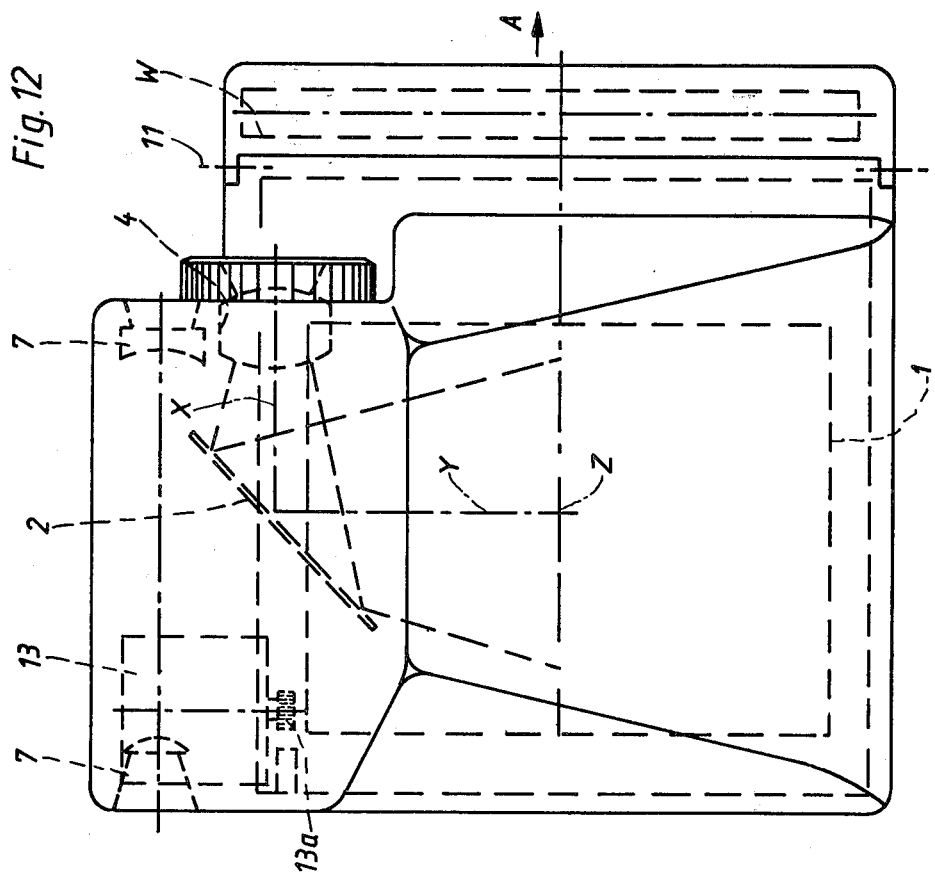
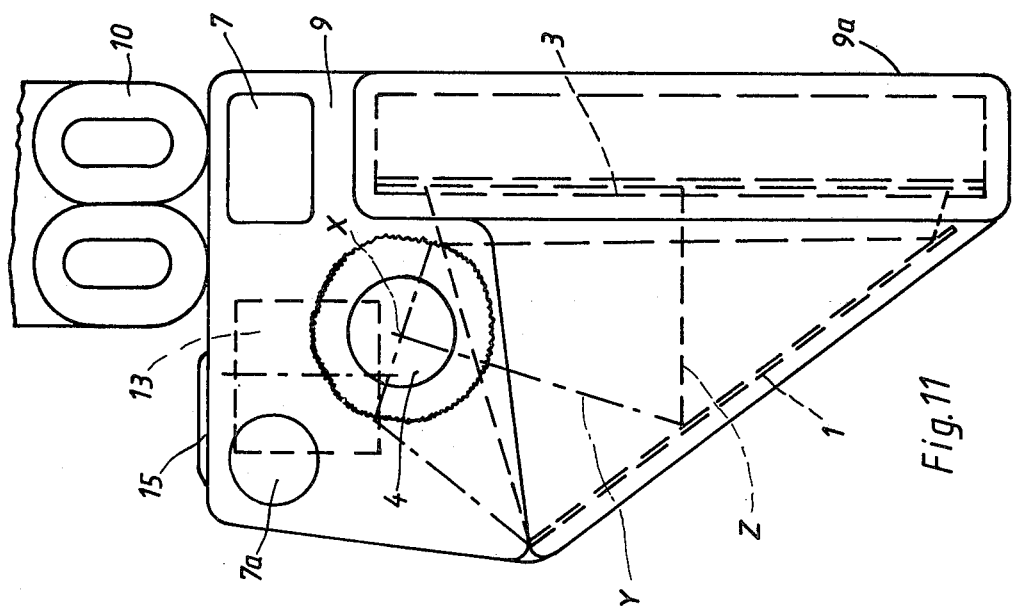

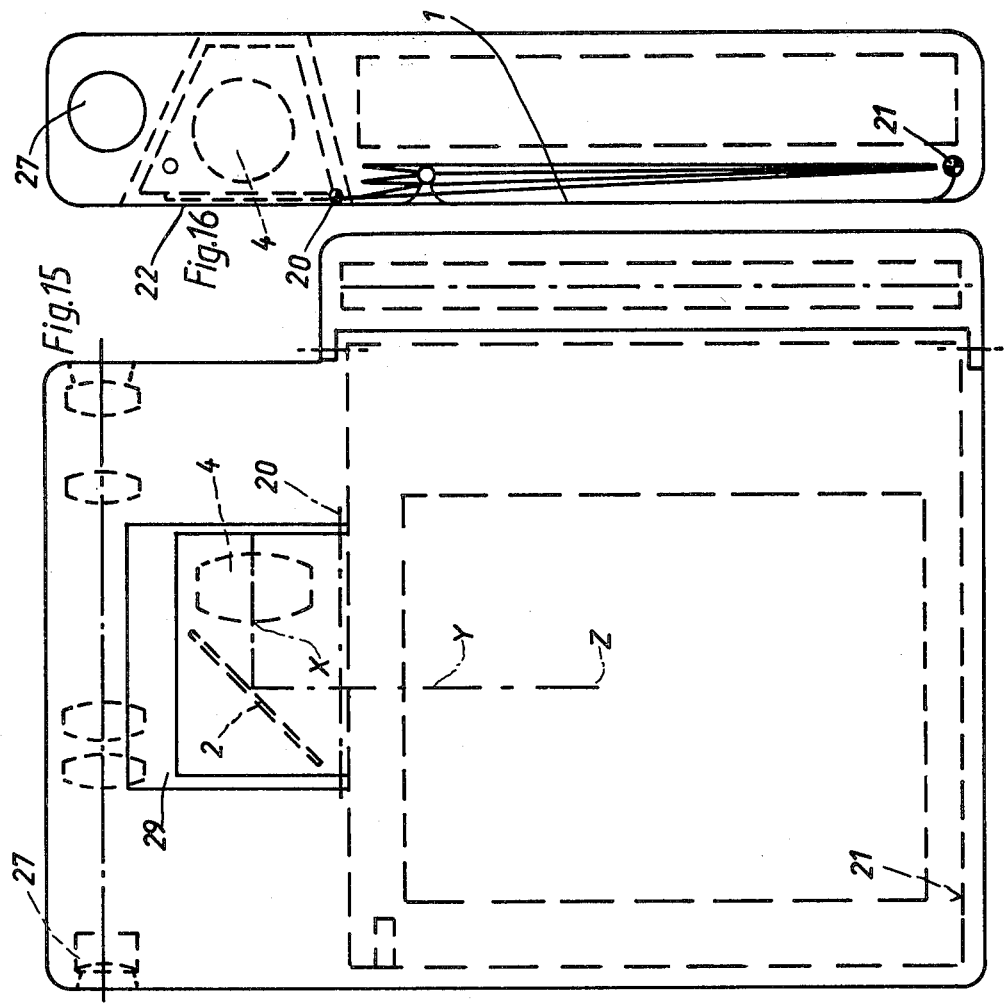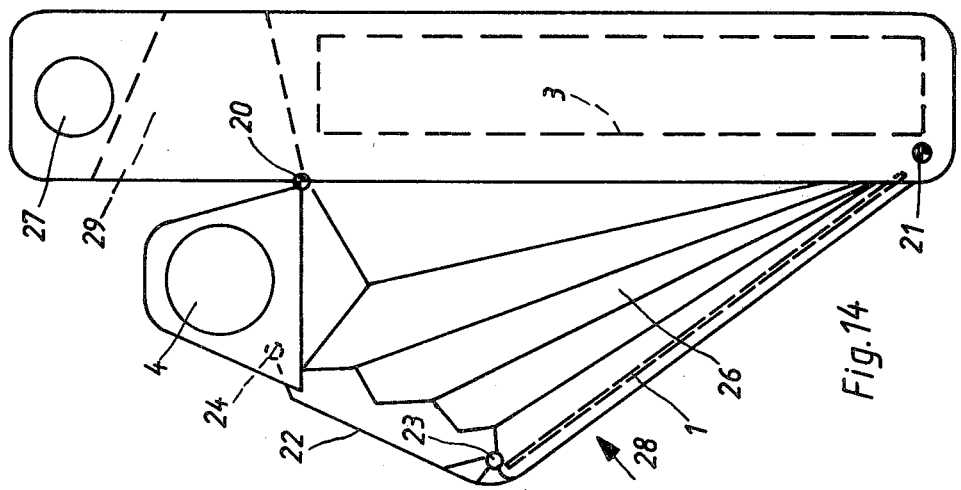

ARRANGEMENT OF A PHOTOGRAPHIC CAMERA

BACKGROUND OF THE INVENTION

This invention relates generally to photographic cameras, and more particularly to photographic cameras having two deviating mirrors for establishing a reflected path of travel for light rays between the objective and the film, whereby the mirror assigned to the film is inclined relative to the plane of the film.

As known from the prior art, cameras of the above-defined type, especially the instant-print or Polaroid cameras are, due to the relatively large size of their images, relatively bulky. Various ways have been devised how, by means of folding structures, this disadvantage can be at least partially eliminated during the transportation and storing of the camera. An instant-print camera is also known having two mirrors inclined against each other in a roof-like manner to define a polygonal path of travel of light rays between the objective and the film whereby the optical axis of respective straight portions of the path of travel of the rays lie in a single plane perpendicularly to the plane of the film. A camera operating on this principle has been described, for example, in the German Design Patent No. 1,978,478. Furthermore, there are also constructions employing one mirror only. This single mirror arrangement is made possible only then when special methods are employed for producing an image on the exposure side of the film so that the correct orientation of the image can be maintained.

SUMMARY OF THE INVENTION

An object of this invention is to provide a camera having two deviating mirrors, particularly an instant-print camera, that is more compact than prior-art cameras of this type.

Another object of this invention is to combine the two deviating mirrors with the objective and the film strip in such a manner as to enable effective adjustments and variations of the camera having configurations according to different aesthetic and operational requirements.

According to this invention, the above objects are attained by arranging mutual position of the two mirrors with respect to the objective and to the film strip in such a manner that the axis of light rays between the one mirror and the objective lies on a different plane than the optical axis of light rays between the other mirror and the film strip. In other words, the optical axis is directed in such a manner that its successive sections lie in two different planes.

By means of this arrangement it is possible to design different housing configurations having a particularly compact design and capable of being adjusted to different operational requirements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 1-8 each show a schematical view in one orthogonal plane of different examples of the arrangement of the deviating mirrors with respect to the objective and the film strip in accordance with this invention;

FIGS. 1'-8' show the examples of FIGS. 1-8 in another orthogonal plane;

FIGS. 1a-8a show schematically a view in one orthogonal plane of different configurations of a camera housing corresponding to the arrangements in FIGS. 1-8;

FIGS. 1'a-8'a show the examples of FIGS. 1a-8a in another orthogonal plane;

FIG. 9 is a plan view of a camera housing having a horizontally directed film cassette;

FIG. 10 is a side view of the camera housing of FIG. 9;

FIG. 11 is a side view of a camera housing having vertically arranged film cassette;

FIG. 12 is a plan view of the camera housing of FIG. 11;

FIG. 14 is a side view of a folding camera housing having a vertically positioned film cassette and bellows shown in its extended position;

FIG. 15 is a plan view of the camera housing of FIG. 14; and

FIG. 16 is another side view of the camera of FIG. 15 with bellows in its unfolded position.

Figure 7:
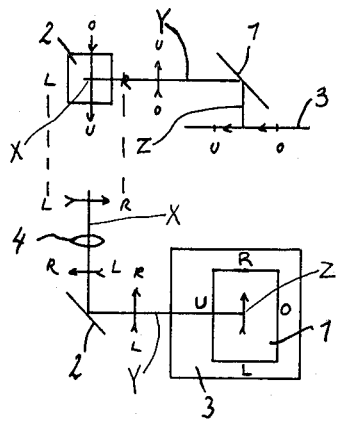
Figure 7A:
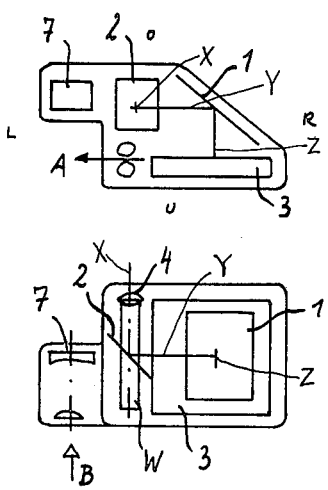

DESCRIPTION OF THE PREFERRED EMBODIMENTS:

Referring now to FIGS. 1-8, FIGS. 1'-8' FIGS. 1a-8a and FIGS. 1'a-8'a, there are shown schematically various embodiments of the arrangement of the camera objective, deflecting mirrors and the film strip as well as various configurations of the housing, all having an optical axis XYZ extending in two different planes resulting from the application of this invention.

In all Figures, like component parts are denoted by the same reference numerals. A large deviation mirror 1 is mounted above a picture plane 3a on the upper surface of a film strip 3. The smaller deviation mirror 2 is arranged behind the objective 4. Both deviating mirrors 1 and 2 have a substantially rectangular shape so that the image field or plane 3a is also rectangular and has an off-center position on the film strip to define a narrow marginal portion 3b at one small side of the film strip and a broader marginal portion 3c at the opposite small side. In an instant-print film, the narrow marginal part 3b contains a fixing agent for the developer and the broader marginal portion 3c carries a developer pouch. The broad margin 3c of the film strip in instant-print cameras must be directed towards developing rollers W arranged at the exit of the instantly developed print in the camera body. In the schematic illustrations of the various embodiments of this invention, the operative position of the camera with respect to the operator is indicated by orientation marks, R denoting the right side, L denoting the left side, O for the top of the camera and U for the bottom of the camera. The camera oriented according to the aforementioned orientation marks faces towards the object of which a picture is being taken, whereby the image projected on the image plane 3a has its broad side adjacent the broad marginal portion 3c. As known, the orientation of projected images can be changed by rearrangement of the light deviating and projecting systems, in this case, of the objective 4 and the deviating mirrors 1 and 2. Such change in the orientation of the final picture is designated, in the drawings, by arrows 5 and 6 showing the final orientation of the image in the horizontal or vertical direction.

In the schematic diagrams of the camera arrangements according to FIGS. 1a–8a, the bearing of the camera is also indicated by the four orientation marks defining normal viewing direction taken by the camera operator. This viewing direction is always indicated by arrow B near the viewfinder 7; the direction of the discharge of film strip 3 is indicated by arrow A near the print exit.

In the design of the camera housings, care is taken that the viewfinder 7 be positioned, if possible, at the left upper corner of the camera housing. The reason for this arrangement is that most of camera operators use their right eye for the viewfinder.

In the embodiment according to FIGS. 1 and 1a, the housing has to be held vertically. The parallax between the viewfinder 7 and the objective 2 is relatively large.

In the modification of the camera housing as shown in FIGS. 2 and 2a, the eyepiece or ocular of viewfinder 7 is arranged either side-by-side of the objective 4 or directly in the optical axis of the light rays behind the objective 4. In the latter case the deviating mirror 2 (FIG. 2a) is arranged swingably as it will be explained later in connection with the embodiment according to FIG. 13.

In the embodiments shown in FIGS. 3 and 3a, a relatively non-membered configuration of the housing results. The viewfinder 7 complements the empty corner behind the large deviating mirror, so that the camera has a substantially rectangular cross-section (FIG. 3a).

In the embodiment shown in FIG. 4 or 4a, a variation of this invention is shown wherein a viewfinder system 7 is arranged side-by-side to the objective 4.

The embodiments according to FIGS. 1–4 and FIGS. 1a–4a, have the common feature that the camera housing during hormal picture taking operation is to be held vertically, that is, its long edge is to be in vertical position to achieve that the broad marginal part 3c of the film strip 3 be adjacent to the lower edge of the image projected on the image plane 3a. The direction A of the discharge of the film strip 3 is parallel or anti-parallel to the direction B of viewing.

A different positioning of the camera is shown in the following embodiments. According to FIGS. 5 and 5a, the eyepiece of the viewfinder system 7 is again arranged on the optical axis of light rays travelling from the objective 2, behind the light deflecting mirror 2; the mirror 2 is again swingably supported to give way to the light rays from the objective during the view finding. The film discharge direction A in this embodiment is transverse to the viewing direction B. As indicated by the orientation marks, the camera is to be held horizontally whereby the holder or cassette for the film strip 3 is at the top of the camera housing.

A similar arrangement is shown in FIGS. 6 and 6a, with the exception that the viewfinder 7 is arranged on the opposite side of the housing from the objective 4. Consequently, a relatively large viewfinding parallax will result. The embodiment shown in FIG. 7 avoids this by placing the viewfinding system 7 side-by-side with the objective 4 and the housing thus becomes slightly irregular in shape. During the normal position of the camera the film holder is located at the bottom of the housing.

Figure 8:
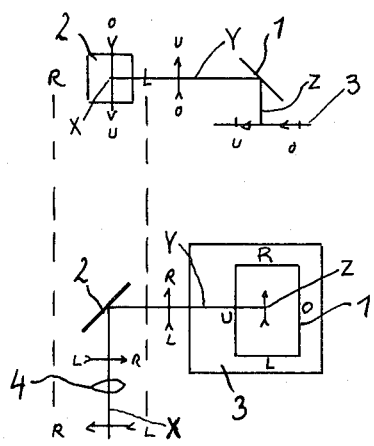
Figure 8A:
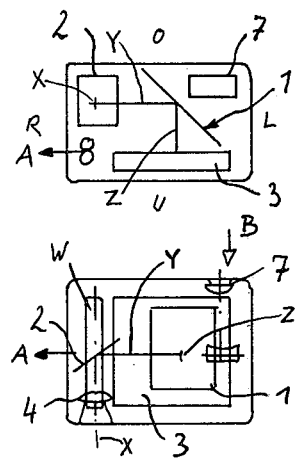

In the modification shown in FIGS. 8 and 8a, the viewfinder system complements the camera into a box-like configuration.

In the following Figures, several selective examples of possible variations of this invention are explained in more detail.

FIGS. 9 and 10 show an embodiment of the arrangement of this invention resulting in a horizontally oriented camera housing. In principle, this embodiment corresponds to the diagrams of FIGS. 5 and 5a. Upon the flat upper side of the camera there are located a release button 16 and a socket for flash bulbs 10. The remaining reference characters correspond to those used in the preceding Figures.

FIGS. 11 and 12 show another embodiment according to the principle illustrated schematically in FIGS. 2 and 2a. The incoming beam of rays passes through the objective 4 and is deviated by the small mirror 2 to impinge upon the large mirror 1 from which it is again deviated in a different plane toward the image plane on the film strip 3. The objective 4 is located in an opening of the camera housing 9 and has its optical axis parallel to a side wall 9a of the housing. A pair of developing rollers W is in conventional manner supported for swingable movement about an axis 11. An electromotor 13 drives, via a bevel gear 13a and a gear train (not shown), a film advancing device. On the upper surface of the housing 9 is also arranged a release button 15 and a flash 10. An additional window 7a at the front side of the camera serves as a second window for a range finder or alternatively as an opening for an exposure meter or an exposure controlling device. In this embodiment the completed picture print is discharged at the front side of the camera.

Figure 13:
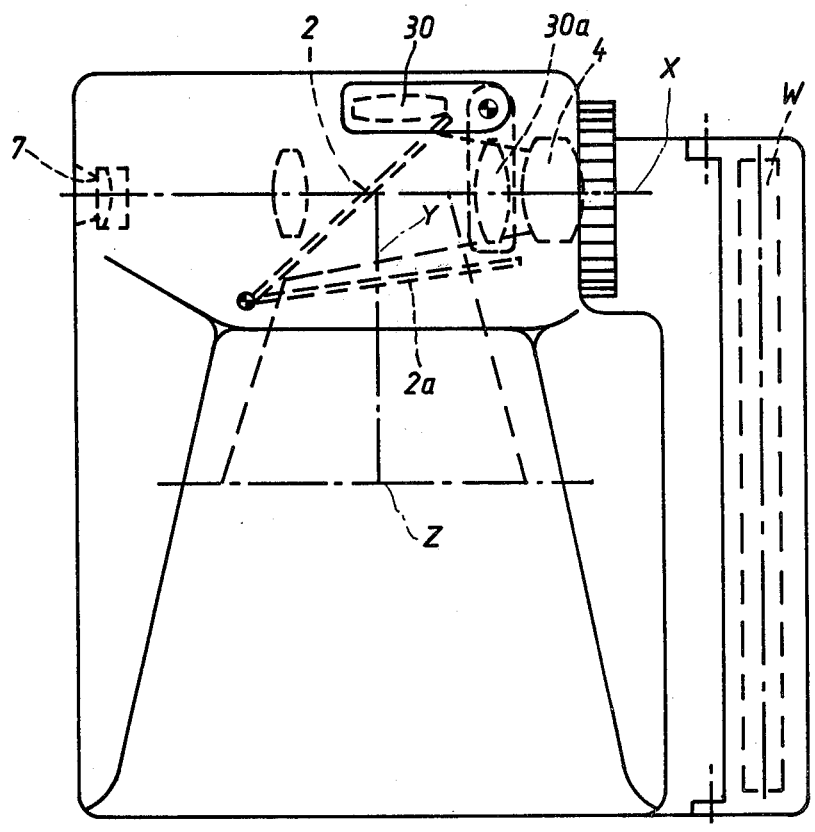
FIG. 13 is a plan view of a modification of the housing of FIGS. 10 and 11.

FIG. 13 shows a modified version of a camera according to this invention wherein the samall deviating mirror 2 is tiltably supported to resume a swung-up position 2a so that the eyepiece of the viewfinder 7 is in alignment with the objective 4. At the same time, a lens 30 is angularly displaced into a position 30a behind the objective 4 so that in connection with the eyepiece 7 a telescopic viewfinder is created using the objective lens 4 itself. In the position 2a, the deviating mirror 2 seals the interior of the camera against light. In a known manner, upon actuation of the release button of the camera, the deviating mirror 2 is returned from its swung-up position 2a to its normal position, whereupon a shutter (not shown) is actuated. In the subsequent film-advancing step, the mirror 2 is swung up again and the release biased.

This mechanism operates in a similar way as in a single reflex camera. It is pointed out, however, that in this embodiment no conventional single-mirror reflex viewfinder is used. The optical arrangement of the viewfinder does not constitute the subject matter of this invention and, therefore, will not be discussed in detail.

The embodiment shown in FIGS. 14–16 corresponds in principle to the schematic diagrams shown in FIGS. 2 and 2a. In this embodiment, the objective 4, as well as the deviating mirror 2, are together tiltable about an axis 20 and the large mirror 1 is tiltable about an axis 21; a coupling member 22 is linking at the pivot points 23 and 24 the parts of the camera housing that support the two deviating mirrors. A bellows 26 protects the space between the mirrors and the film strip 3 against the access of light. A telescopic viewfinder 27 is arranged at the top portion of the camera.

If the operator depresses the camera housing in the direction of arrow 28 (FIG. 14) the part of the housing that contains the objective 4 and the small deviating mirror 2 is tilted into a recess 29 in the camera body and the coupling member 22 with the large deviating mirror 1 are folded to abut on a side of the camera housing. In the folded condition the camera resumes a compact shape as shown in FIG. 16. In the areas on both sides of the recess 29 there is room for the electric drive motor and batteries.

While the invention has been described and illustrated as embodied in specific embodiments, it is not intended to be limited to the details shown, since various modifications and structural changes may be made without departing in any way from the spirit of the present invention. For example, the angular positions of the light rays need not be perpendicular and parallel and can be modified according to specific operational conditions. Also, the position of the deviating mirrors need not define a rectangular path of travel of the light rays but may form a trapezoidal path, for example. In the embodiments shown in FIGS. 14–16, a modification is also possible wherein the path of travel of the light rays is inclined relative to the film plane. This inclined arrangement might bring advantages in spatial arrangements of the camera. It is also possible to angularly displace the large mirror 1 with respect to the film strips.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic camera having a housing, an objective in one wall of the housing, means disposed in said housing for supporting a film strip in an image plane, and means for advancing the film strip in a feeding direction, an arrangement comprising a first light reflecting member for deviating light rays travelling from said objective along a first optical axis, a second light reflecting member for deviating light rays travelling thereto from said first light reflecting member along a second optical axis, said second light reflecting member deviating said light rays along a third optical axis towards said film strip supporting means, said first optical axis and said second optical axis defining a first plane that is different from a second plane defined by said second optical axis and said third optical axis.

2. An arrangement as defined in claim 1, wherein said first light reflecting member is arranged perpendicularly relative to said image plane.

3. An arrangement as defined in claim 1, wherein said second plane is parallel to said image plane and said first optical axis extends parallel to one edge of said film strip.

4. An arrangement as defined in claim 1, wherein said first optical axis is parallel to said feeding direction.

5. An arrangement as defined in claim 1, wherein said first optical axis is perpendicular to said film feeding direction.

6. An arrangement as defined in claim 1; further including a swingable support for said first light reflecting member and a viewfinder system arranged along said first optical axis.

7. An arrangement as defined in claim 1, wherein said camera housing comprises bellows for accommodating said second light reflecting member, a hinged housing portion for accommodating said first light reflecting member, and a recess for receiving said hinged portion when said bellows are in unfolded condition.

8. In a photographic camera having a housing, an objective in one wall of the housing, means disposed in said housing for supporting a film strip in an image plane, and means for advancing the film strip in a feeding direction, an arrangement comprising a first light reflecting member for deviating light rays travelling from said objective along a first optical axis; a second light reflecting member for deviating light rays travelling thereto from said first light reflecting member along a second optical axis, said second light reflecting member deviating said light rays along a third optical axis towards said film strip supporting means, said first optical axis and said second optical axis defining a first plane that is different from a second plane defined by said second optical axis and said third optical axis; a swingable support for said first light reflecting member and a viewfinder system arranged along said first optical axis, said viewfinder system including a swingably supported lens actuated simultaneously with said swingable support for said first light reflecting member to create together with said objective a telescopic viewfinder.

* * * * *